United States Patent
Farinacci et al.

(10) Patent No.: US 9,288,067 B2
(45) Date of Patent: Mar. 15, 2016

(54) ADJACENCY SERVER FOR VIRTUAL PRIVATE NETWORKS

(75) Inventors: Dino Farinacci, San Jose, CA (US);
Gaurav Badoni, San Jose, CA (US);
Hasmit Grover, Fremont, CA (US);
Dhananjaya Rao, Milpitas, CA (US);
Nataraj Bacthu, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 724 days.

(21) Appl. No.: 13/424,569

(22) Filed: Mar. 20, 2012

(65) Prior Publication Data

US 2013/0250949 A1    Sep. 26, 2013

(51) Int. Cl.
*H04L 12/28* (2006.01)
*H04L 12/18* (2006.01)
*H04L 12/721* (2013.01)
*H04L 12/761* (2013.01)

(52) U.S. Cl.
CPC ............ *H04L 12/1836* (2013.01); *H04L 45/16* (2013.01); *H04L 45/66* (2013.01)

(58) Field of Classification Search
USPC .................. 370/328, 338, 389, 390, 392, 401
See application file for complete search history.

(56) References Cited

U.S. PATENT DOCUMENTS

| | | | |
|---|---|---|---|
| 7,827,262 | B2 | 11/2010 | Weis |
| 2005/0223229 | A1* | 10/2005 | Roeder et al. ................. 713/171 |
| 2006/0126668 | A1* | 6/2006 | Kwon et al. .................. 370/486 |
| 2006/0209831 | A1* | 9/2006 | Shepherd et al. ............ 370/392 |
| 2006/0264218 | A1* | 11/2006 | Zhang et al. ................. 455/450 |
| 2006/0291404 | A1* | 12/2006 | Thubert et al. ............... 370/254 |
| 2007/0058329 | A1* | 3/2007 | Ledbetter et al. ............ 361/681 |
| 2008/0107033 | A1* | 5/2008 | Zhang et al. ................. 370/238 |
| 2009/0037607 | A1* | 2/2009 | Farinacci et al. ............ 709/249 |
| 2011/0110370 | A1* | 5/2011 | Moreno et al. ............... 370/392 |
| 2013/0198558 | A1* | 8/2013 | Rao et al. ...................... 714/4.2 |

* cited by examiner

*Primary Examiner* — Ricky Ngo
*Assistant Examiner* — Christine Ng
(74) *Attorney, Agent, or Firm* — Edell, Shapiro & Finnan, LLP

(57) ABSTRACT

Devices, methods and instructions encoded on computer readable medium are provided herein for creation of an overlay network on a non-multicast or source specific multicast (SSM) core. In one example, virtual private network (VPN) adjacencies are established between an adjacency server and one or more edge devices each located at different network sites. A unicast replication list is then generated at the adjacency server. The unicast replication list includes the Internet Protocol addresses for each of the edge devices having VPN adjacencies with the adjacency server. The unicast replication list is then advertised to each of the edge devices for use in establishing VPN adjacencies with one another.

21 Claims, 6 Drawing Sheets

ADJACENCY SERVER FOR VIRTUAL PRIVATE NETWORKS

TECHNICAL FIELD

The present disclosure relates to connecting sites via a virtual private network.

BACKGROUND

Modern data center deployments typically span multiple sites, each with its own local network. The multiple sites are generally interconnected via a larger network, referred to herein as a core network. Each site includes one or more network devices, referred to herein as edge devices (nodes), that facilitate the transport of information between the local network and the core network (i.e., originate or terminate communications over the core network). The sites also include one or more intermediate network devices (nodes) that facilitate the operation of the local network for the communications between computing devices in the site and the edge devices.

A virtual private network (VPN) is a private network that uses a public network (e.g., core network) to connect the remote sites. The VPN uses "virtual" connections routed through the core network so that the devices at the different sites can securely share information and resources. In certain circumstances, a VPN may be established through the use of an Overlay Transport Virtualization (OTV) mechanism. The OTV mechanism provides an "overlay" method of virtualization (rather than traditional "in-the-network" methods in which multiple routing and forwarding tables are maintained in every device between a source and a destination). A VPN established using the OTV mechanism is sometimes referred to herein as an overlay network.

DESCRIPTION OF EXAMPLE EMBODIMENTS

Overview

Devices, methods and instructions encoded on computer readable medium are provided herein for creation of an overlay network on a non-multicast or source specific multicast (SSM) core, collectively referred to herein as a non-any source multicast (non-ASM) core network. In one example, virtual private network (VPN) adjacencies are established between an adjacency server and one or more edge devices each located at different network sites. A unicast replication list is then generated at the adjacency server. The unicast replication list includes the Internet Protocol (IP) addresses for each of the edge devices having VPN adjacencies with the adjacency server. The unicast replication list is then advertised to each of the edge devices for use in establishing VPN adjacencies with one another.

Example Embodiments

Figure 1:
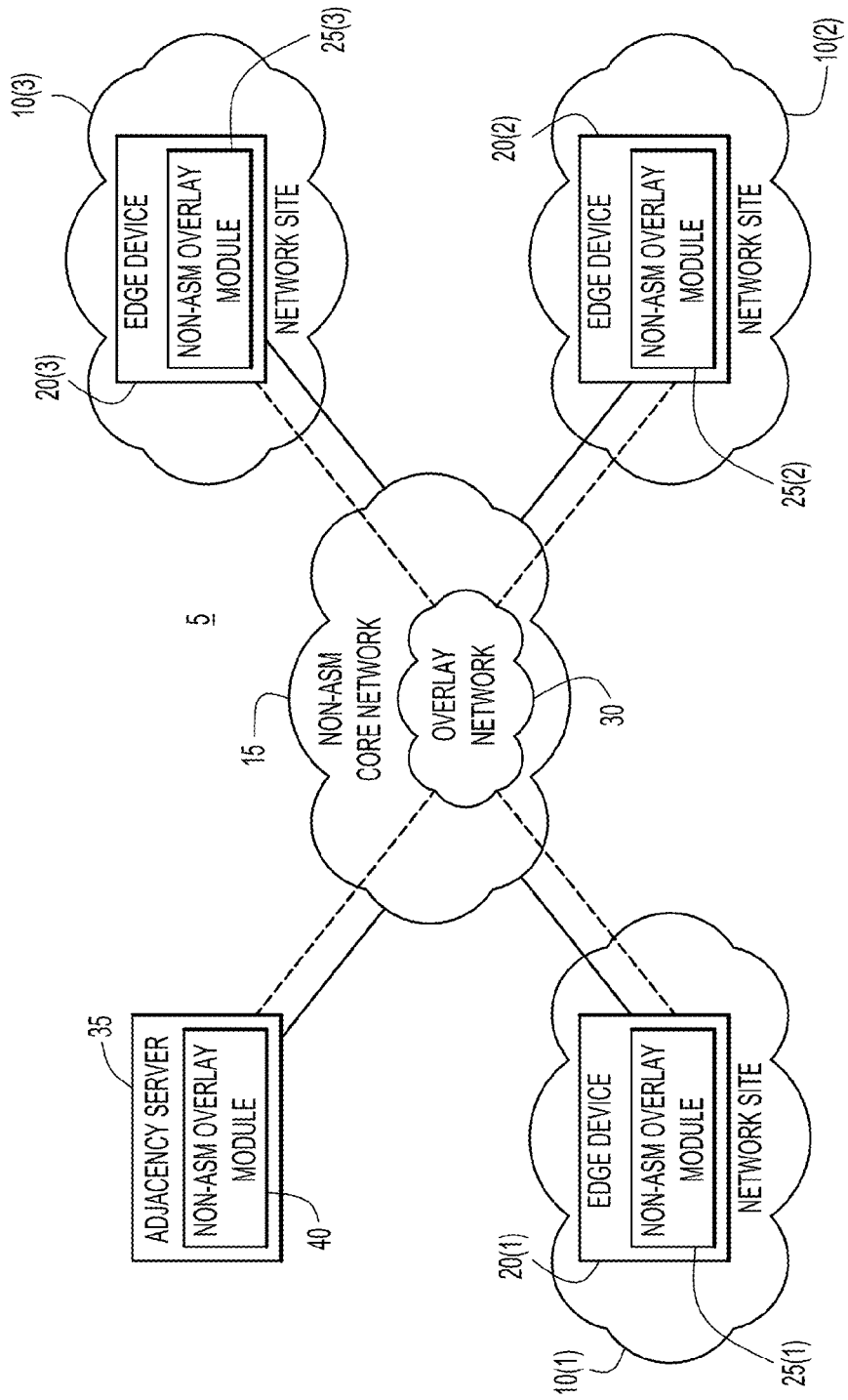
FIG. 1 is a block diagram showing an example in which multiple network sites are configured to communicate via an overlay network.

FIG. 1 is a block diagram of an entity 5 (e.g., data center, corporation, university, etc.) having multiple sites 10(1)-10(3). For ease of illustration, examples will be described herein with reference to entity 5 operating as a data center in which the multiple sites 10(1)-10(3), sometimes referred to herein as network sites, are interconnected by a core network 15. The core network 15 is a layer 2 (L2) or layer 3 (L3) network.

Network sites 10(1), 10(2), and 10(3) each comprise an edge network device (node) 20(1), 20(2), and 20(3), respectively. Edge network devices 20(1), 20(2), and 20(3) each include a non-ASM overlay module 25(1), 25(2), and 25(3), respectively. The edge network devices 20(1)-20(3), simply referred to herein as edge devices, are configured to facilitate the transport of information between the core network 15 and a local network (not shown in FIG. 1) at their respective network site.

Network sites 10(1)-10(3) are connected by a virtual private network (VPN) 30 that is established through an Overlay Transport Virtualization (OTV) mechanism. An OTV mechanism provides an "overlay" method of virtualization (rather than traditional "in-the-network" methods in which multiple routing and forwarding tables are maintained in every device between a source and a destination). As such, VPN 30 is also referred to herein as an overlay network 30.

With OTV, state is maintained at the network edges (i.e., edge devices 10(1)-10(3) communicating over the core network 15), but is not maintained at other devices within the core network 15. In other words, OTV operates at the edge devices 20(1)-20(3) interposed between the network sites 10(1)-10(3) and the core network 15. The edge devices 20(1)-20(3) perform layer 2 learning and forwarding functions (similar to a traditional layer 2 switch) on their site-facing interfaces (site interfaces) and perform IP based virtualization functions on their core-facing interfaces (core interfaces), for which an overlay network is created. The dual functionality of the edge devices 20(1)-20(3) provides the ability to connect layer 2 networks, layer 3 networks, or hybrid (layer 2 and layer 3) networks together. OTV can also run at the same time as the network sites 10(1)-10(3), and the core network 15 is operating with "in-the-network" virtualization via Virtual Routing and Forwarding (VRF) or Virtual Network (VNET).

In operation, OTV encapsulates layer 2 traffic with an IP header and does not include the creation of stateful tunnels. Furthermore, layer 2 traffic that traverses the overlay network to reach its destination is prepended with an IP header. This ensures that the packet is delivered to the edge devices that provide connectivity to the layer 2 destination in the original Media Access Control (MAC) destination header. Traffic is forwarded natively in the core network 15 over which OTV is deployed, based on the IP header. The native IP treatment of the encapsulated packet allows optimal multi-point connectivity as well as optimal broadcast and multicast forwarding. OTV is independent of the technology deployed in the core network 15 and there are substantially no changes to core devices.

OTV provides a state to map a given destination MAC address in a layer 2 VPN to the IP address of the OTV edge device behind which that MAC address is located. OTV forwarding is therefore a function of mapping a destination MAC address in the VPN site to an edge device IP address in the overlay network. A control plane is used to exchange "reachability" information among the different OTV edge devices. In one example the control plane uses an overlay Interior Gateway Protocol (IGP) to carry MAC addresses and IP addresses. The MAC addresses are those of hosts connected to the network and the IP addresses are the next hops of the edge devices through which the hosts are reachable via the core.

In another example, the control plane utilizes Intermediate System-to-Intermediate System (IS-IS) as an IGP capable of carrying a mix of MAC unicast and multicast addresses as well as IP addresses. The information carried in IS-IS Link State Packets (LSPs) includes MAC unicast and multicast addresses with their associated VLAN IDs (or VNIDs in the case of L3 VPNs), and IP next hops. Since all MAC addresses on a site are advertised in IS-IS packets to all other sites, all edge devices have knowledge of all MAC addresses for each VLAN in the VPN. It is to be understood that routing protocols other than IS-IS may also be used.

Some of the elements in an overlay network may include routers, switches, gateways, servers, or other network devices. OTV defines an overlay network coupled to each of the edge devices 20(1)-20(3) at the sites 10(1)-10(3). The sites are thus connected together via the edge devices 20(1)-20(3) that operate in the overlay network to provide layer 2 or layer 3 site connectivity. In certain examples, there is a single IS-IS process for the overlay network. However, there may also be multiple IS-IS processes running within an overlay network or on a single edge device, with each serving a different VPN. IS-IS may also be configured so that it is fault tolerant across Virtual Device Contexts (VDCs).

Since OTV may be executed on a layer 2 or a layer 3 core transport, a transport independent mechanism is provided to allow peering between edge devices 20(1)-20(3). The edge devices 20(1)-20(3) include an IP address on their core facing interface, referred to herein as their overlay interfaces. In conventional arrangements, as detailed further below, the edge devices 20(1)-20(3) simply join a configured Any Source Multicast (ASM)/Bidirectional multicast group in the core transport network 15 by sending IGMP reports. The edge devices 20(1)-20(3) are therefore, conventionally, hosts relative to the core, subscribing to multicast groups that are created in the provider network 15 and which rely on a provider Unicast/Multicast Routing Protocol (pUMRP).

In conventional arrangements in which an OTV mechanism is used to establish an overlay network, the core network is an ASM core network. An ASM core network is a specific type of multicast network in which multiple edge devices communicate on a common multicast channel/group. When communicating on the channel, the edge devices are not aware of each other's IP addresses (i.e., communication in an ASM core network is independent of both the source and destination addresses).

This source/destination address independence of ASM core networks enables the use of the OTV mechanism. In operation, the OTV mechanism allows for the creation of the common multicast channel on the ASM core network, and enables the edge devices to join the channel, thereby establishing the overlay network. In other words, in conventional arrangements all edge devices that are members of an overlay automatically discover one another by virtue of joining the shared multicast channel, without any further configuration.

Furthermore, because the core network is an ASM network, when a packet is to be sent to multiple devices on the channel (i.e., a multicast packet), the core network itself will perform packet replication and forwarding to multiple sources.

Although ASM core networks are suited for supporting an overlay network, ASM core networks are not always available. For example, in certain circumstances only a unicast (i.e., non-multicast) core network may be available. A unicast core network is a network in which unicast messages are sent from a single source to a single destination identified by a unique IP address. Therefore, in contrast to multicast messaging in which there may be multiple-to-multiple connections (i.e., multiple senders/destinations), unicast messaging uses a one-to-one connection (i.e., only one source and only one sender).

In other circumstances, only a source specific multicast (SSM) core network may be available. A SSM core network is a network in which a device will only receive multicast packets that originate from a specific source. More specifically, similar to the above ASM example, a multicast channel is created to which different edge devices may join. However, in contrast to ASM, in order to receive information from the source device, devices operating on a SSM network should also be aware of the other device's source addresses. In other words, when the devices join the multicast channel, the devices also join trees associated with specific sources addresses. This results in the loss of the source address independence that is available on an ASM core network.

Therefore, a problem with non-ASM core networks (i.e., unicast core networks or SSM core networks) is that, in order for edge devices to communicate via an overlay network, the edge devices should be aware of each other's IP addresses. However, the conventional OTV mechanism is not designed to distribute IP addresses during establishment of the overlay network. Rather, as noted above, only the common channel information is distributed and the devices simply join the channel. Accordingly, proposed herein are new techniques in which an overlay network may be established on a non-ASM core network through a simple automated provisioning process. More specifically, an adjacency server is provided to distribute IP address information to the various edge devices for using in establishing the overlay network.

An example adjacency server 35 having a non-ASM overlay module 40 is shown in FIG. 1. Non-ASM overlay module 40 comprises hardware and/or software components that enable adjacency server 35 to distribute IP address information in non-ASM core network 15. This distribution of the IP addresses occurs through cooperation of non-ASM overlay module 40 with each of the non-ASM overlay modules 25(1), 25(2), and 25(3) of edge devices 20(1), 20(2), and 20(2).

Figure 2:
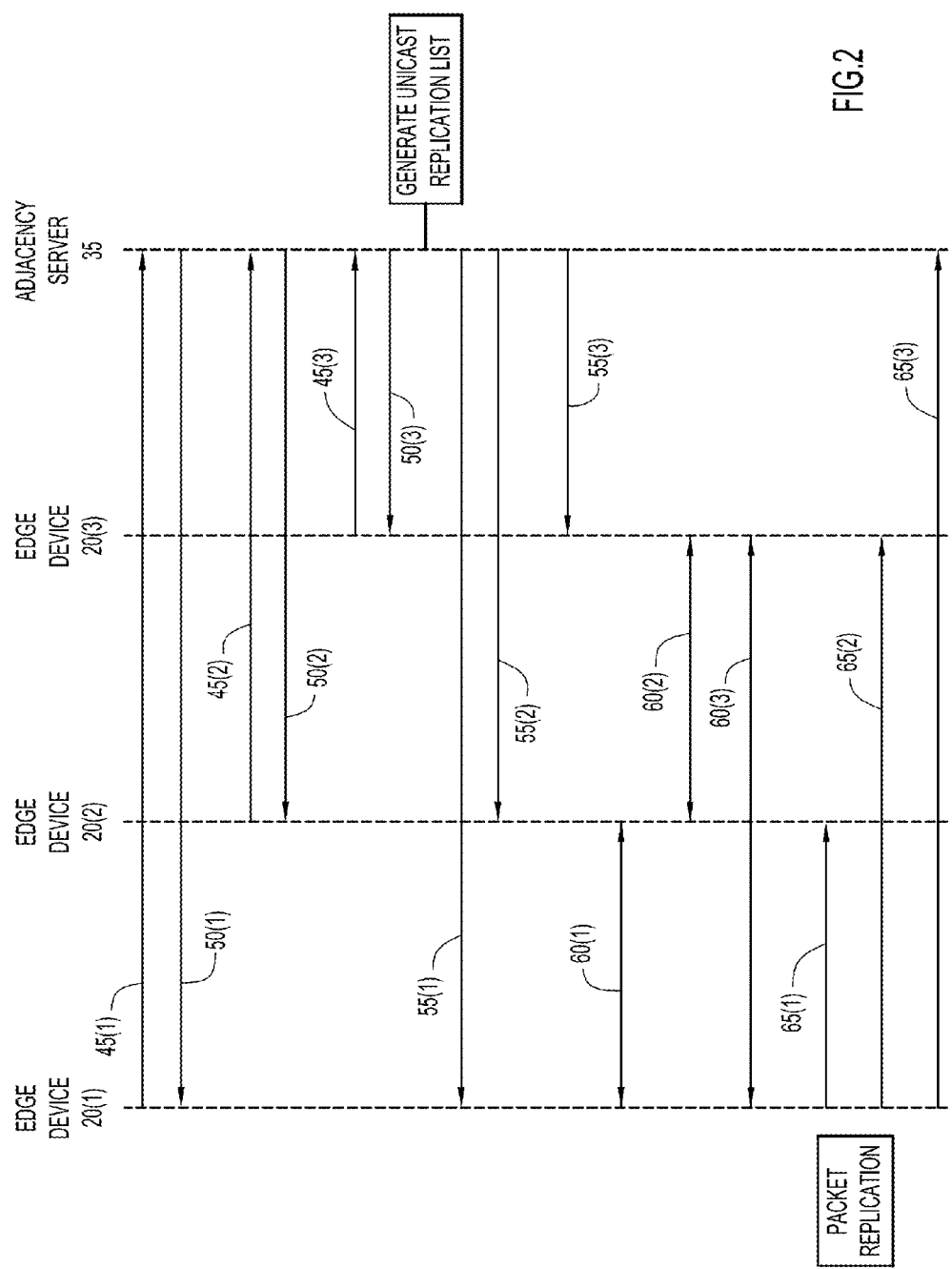
FIG. 2 is a ladder flow diagram illustrating communications among edge devices and an adjacency server during establishment of an overlay network in accordance with examples described herein.

FIG. 2 is a ladder flow diagram illustrating the distribution of IP address information for edge devices 20(1)-20(3) and the establishment of overlay network 30 on non-ASM core network 15. In order to establish the overlay network 30 on non-ASM core network, the edge devices 20(1)-20(3) first discover one another (i.e., receive each other's IP addresses). This discovery is enabled through adjacency server 35.

Edge devices 20(1)-20(3) are pre-configured to point to adjacency server 35 when the edge devices start-up. In other words, the edge devices 20(1)-20(3) know the IP address (e.g., Internet Protocol version 4 (IPv4) or Internet Protocol version 6 (IPv6)) address) of the adjacency server 35. The edge devices 20(1)-20(3) may be configured with this address through a command-line interface (CLI) and can start sending packets to this address immediately upon start-up. In operation, using the pre-configured address for the adjacency server 35, each of the edge devices 20(1)-20(3) are configured to send the adjacency server 35 an adjacency initialization packet (e.g., an IS-IS HELLO packet) that includes the IP address for the transmitting edge device. The transmission of these packets from each of the edge devices 20(1), 20(2), and 20(3) is illustrated in FIG. 2 by arrows 45(1), 45(2), and 45(3), respectively. In response to the receipt of these adjacency initialization packets, adjacency server 35 sends a response adjacency initialization packet (e.g., a response IS-IS HELLO packet) back to each of the edge devices 20(1)-20(3). The transmission of these response packets to each of the edge devices 20(1), 20(2), and 20(3) is illustrated in FIG. 2 by arrows 50(1), 50(2), and 50(3), respectively. The exchange of the adjacency initialization packets between the edge devices 20(1)-20(3) and the adjacency server 35 results in the establishment of an adjacency (i.e., a VPN adjacency) between the edge devices and the adjacency server. As would be appreciated, establishment of the adjacency may include other operations such as, for example, generating and storing data (e.g., IP addresses) in the various devices.

Following receipt of the IP addresses for the edge devices 20(1)-20(3), adjacency server 35 is configured to store the addresses in an IP address database in the server's memory (not shown in FIG. 1). Subsequently, adjacency server 35 generates a list, referred to herein as a unicast replication list, that includes the IP addresses for all of the edge devices that have established adjacencies with the adjacency server (i.e., the adjacency server builds a list of all the devices that are unicasting to it).

After generation of the unicast replication list, adjacency server 35 is configured to advertise the list to each of the edge devices 20(1)-20(3). Advertising the unicast replication list is achieved by encapsulating the list within one or more packets (e.g., using the IS-IS protocol) that are sent to each of the edge devices 20(1)-20(3). In one example, the unicast replication list is sent in unicast packets to all of the edge devices 20(1)-20(3). The transmission of packets including the unicast replication list to each of the edge devices 20(1), 20(2), and 20(3) is shown in FIG. 2 by arrows 55(1), 55(2), and 55(3), respectively. In one example, unicast replication list is advertised in a new IS-IS HELLO type-length value (TLV) that is sent unicast to each member of the unicast replication list. It is to be appreciated that IS-IS, itself does not do the replication. Instead, the lower layers perform replication to make the upper layers think the overlay is a multi-access multicast-capable logical network.

In operation, adjacency server 35 is configured to periodically advertise the unicast replication list to the edge devices 20(1)-20(3). This periodic advertisement ensures that the edge devices 20(1)-20(3) are regularly updated with the latest IP address information. This may be beneficial, for example, when edge devices are added or removed from the core network.

Following advertisement of the unicast replication list, each of the edge devices 20(1)-20(3) is configured to store the list in local memory. Therefore, each of the edge devices 20(1)-20(3) has the IP addresses of other edge devices. Because the edge devices 20(1)-20(3) now know about all of the other devices, the edge devices can establish adjacencies with one another (i.e., establish a full mesh overlay network). The establishment of the adjacencies between the edge devices 20(1)-20(3) are shown by bi-directional arrow 60(1) (adjacency between edge devices 20(1) and 20(2)), arrow 60(2) (adjacency between edge devices 20(2) and 20(3)), and arrow 60(3) (adjacency between edge devices 20(1) and 20(3)). These adjacencies are established by exchanging adjacency initialization packets between the devices.

In one specific example, the edge devices 20(1)-20(3) receive the IS-IS HELLO TLV from the adjacency server 35 and discover the other edge devices for the VPN. The IPv4/IPv6 addresses of the other edge device are used to send subsequent IS-IS HELLO packets to the other edge devices. The IS-IS HELLO packets are unicast-replicated at the lower layers to each address in the received unicast replication list.

As noted above, non-ASM core network 15 may be a unicast-only core network (non-multicast core network) or a SSM core network. For both of these different types of non-ASM core networks, the overlay network is initially established as described above with reference to FIG. 2 (i.e., through use of adjacency server 35 to distribute a list of IP addresses). In other words, both solutions (non-multicast and SSM core) are the same because the edge devices obtain the source IP addresses for all other edge devices from the adjacency server 35. However, due to the different characteristics of a unicast-only and an SSM core, the exchange of data and subsequent communications on the overlay network will be different for these two different types of non-ASM core networks. That is, there are differences in how packets flow in the overlay network.

In the SSM core (which has multicast capability), the edge devices 20(1)-20(3) will join a multicast channel as well as source specific trees associated with specific source addresses. In general, the packets still flow on the SSM core in a multicast manner (i.e., the core network performs any packet replication and forwarding).

In the unicast-only core network example, the core network does not have the ability to perform packet replication and the packets can only be sent from a single source to a single destination. As such, in such examples, the edge devices 20(1)-20(3) are configured to provide the multicast capability. That is, the edge devices 20(1)-20(3) are each configured to unicast replicate packets so that each edge device is able to send a multicast packet on the non-multicast network. Unicast replication is the function of taking a multicast packet that is originated by the upper layers and making a copy to send to each other edge device which is interested in the multicast packet. The received unicast replication list enables the edge devices 20(1)-20(3) to be aware of other edge devices which should receive such a multicast packet through unicast replication. Accordingly, the overlay protocol (e.g., IS-IS) will still run in multicast mode even though the underlying transport is unicast only, and thus the actual replication is performed by a lower OTV packet forwarding layer.

The unicast replication list provides a simple and automated mechanism for each edge device 20(1)-20(3) to be aware of other edge devices which should receive multicast packets. As such, there is no manually configuration of each of the edge devices to include this information. FIG. 2 illustrates packet replication at edge device 20(1) and arrows 65(1), 65(2), and 65(3) illustrate the transmission of packets to edge device 20(2), edge device 20(3), and adjacency server 35, respectively, on the overlay network 30.

It is to be appreciated that the techniques described herein do not make use of any type of replication server. As such, there are no choke points or longer path delays due to the lack of multicast capability. In other words, the multicast packets, even though sent as unicast, will travel on the same path from the source OTV edge device to each interested edge device for the multicast group. A difference is that there are multiple copies being sent from the source edge device.

FIG. 2 illustrates an example in which three edge devices 20(1)-20(3) communicate via overlay network 30. It would be appreciated that one or more additional edge devices may also be added to this network. When a new edge device is introduced in the network, the edge device will be pre-configured to point to the adjacency server 35 and will send adjacency initialization packets (i.e., IS-IS HELLO packets) to the adjacency server. The adjacency server 35 will add the new edge device to the unicast replication list and advertise the new list to each existing edge device. Therefore, via a single configuration mechanism, the new edge device will dynamically discover all the other edge devices in the network and will also be discovered by all the other edge devices.

For ease of illustration, adjacency server 35 is shown in FIG. 1 as a stand-alone device that may be located at one of the network sites 10(1)-10(3), or disposed at a separate network location. In an alternative example, one of the edge devices 20(1)-20(3), or another edge device, may be designated as the adjacency server and configured to provide the adjacency server functionality described above.

For ease of illustration, the examples of FIGS. 1 and 2 have been described with reference to the use of one adjacency server 35. In an alternative example, there may be more than one adjacency server for each overlay network that is created on core network. That is, a backup adjacency server may be used such that if one server unexpectedly drops off-line, the network can switch to the backup adjacency server and continue to operate, thereby adding redundancy to the network. In such examples, the edge devices are each configured with the addresses of both of the adjacency servers (or other edge devices that each operate as an adjacency server). An OTV edge device will not process TLVs from the backup server until it believes the primary adjacency server has timed out. In still other examples, there can be an adjacency server that serves multiple overlay networks.

The various adjacencies in an overlay network may be deactivated (timed out). The time-out procedure for the adjacencies is similar as when the IS-IS protocol runs over an ASM core network. As such, any routes reachable through time-out adjacencies are removed from the forwarding tables. However, the timed-out adjacencies are not removed from the unicast replication list until after a predetermined time period has elapsed. This predetermined time period is of a sufficient length that allows for a determination as to whether a time-out site has been disconnected or has been removed from the overlay network. In one example, the predetermined period of time is approximately 10 minutes.

It should be appreciated that each edge device will time-out its own adjacencies. Therefore, if the adjacency server stops advertising the uniform replication list in its IS-IS HELLO packets, or if the adjacency server goes down, the edge device will not remove any entries in the uniform replication list. Rather, the entries will be timed out and only removed when the predetermined period of time has expired.

The techniques described herein also provide a graceful mechanism that, when a site is de-configured from an overlay network, the edge devices for the site each send an IS-IS HELLO packet with a hold time of 0. When this occurs, the receiving devices will remove the adjacency from its IS-IS adjacency database as well as the uniform replication list.

When packets are to be sent to all sites of an overlay network, a copy is sent to each address in the unicast replication list. Such packets are IS-IS control packets, broadcast packets, and sometimes link-local multicast packets. When certain sites of the overlay network are members of a multicast group, then the remaining other sites do not receive packets addressed to the subset group. As such, the techniques described herein provide a "subset-unicast replication list" that is maintained per IPv4 and IPv6 multicast route entry. A subset-unicast replication list is a list of address from the full unicast replication list for the specific subset of devices. The subset-unicast replication list may include the entire list of addresses or a subset of addresses, including just a single address. When an OTV edge device determines (via the IS-IS protocol) which sites belong to a multicast group, only one OTV edge device from each site will be in the subset-unicast replication list for the multicast group.

In one example, a subset of edge devices will send the adjacency server packets indicating that the subset of edge devices are each members of a multicast group. The adjacency server will generate a subset-unicast replication list that identifies the subset of edge devices as members of the multicast group, and the adjacency server will then advertise the subset-unicast replication list to each of the edge devices.

In certain examples, group address can be added to the unicast replication list. This allows an OTV VPN to have a mix of unicast-only neighbors and multicast-capable neighbors. The unicast-only neighbor's unicast replication list includes all neighbors in it and the multicast-capable neighbors have a unicast replication list of the group address and each unicast-only neighbor.

To be able to associate an incoming packet which was unicast replicated by an edge device, the packets will have an additional prepended IP header. The inner header will be the same header constructed as if the core supported multicast. That is, this header's destination address contains the group address configured for the overlay network. The outer header, which is prepended, is used to send from the originating edge device to its unicast-only neighbor and therefore, has a unicast destination address.

A hybrid VPN is an overlay network which has a mix of unicast-only edge devices and multicast-reachable edge devices. That is, the devices themselves can support multicast but the core may not be able to deliver multicast packets to every edge device in the VPN. In this case, the multicast-reachable devices send IS-IS HELLO packets and broadcast/multicast data efficiently (to the multicast group) to reach the other multicast-reachable neighboring devices. The replication list for the multicast-reachable edge devices will have the group address (for the multicast-reachable neighbors) as well as the unicast addresses (one for each unicast-only neighbor).

A unicast-only edge device will contain a replication list for all neighbors. That includes both unicast-only neighbors and multicast-reachable neighbors. The adjacency server only announces unicast addresses of newly discovered OTV neighbors.

An overlay network will be realized with a single multicast group. That is, if edge devices are connected to different service providers, the group address should be an inter-domain group where the group address used is agreed upon by all service providers involved. If they cannot agree, the group address is used only for edge devices attached to a single service provider and all other OTV neighbors will be treated as unicast-only edge devices.

Figure 3:
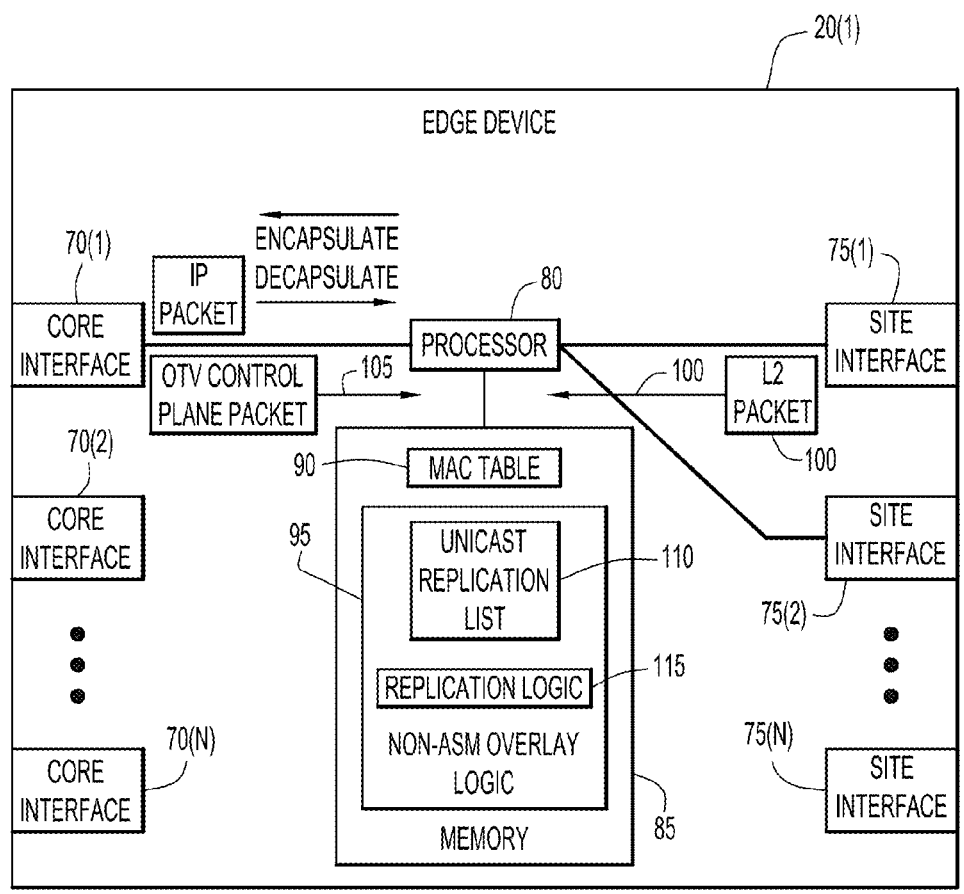
FIG. 3 is a block diagram of an edge device configured to cooperate with an adjacency server in order to establish an overlay network.

FIG. 3 is a block diagram of one implementation of edge device 20(1) of FIG. 1. The edge device is a network device that will typically run as a layer 2 device (e.g., switch), but can be disposed in a device that performs layer 3 routing on other layer 3-enabled ports. For example, the device may perform MAC learning (i.e., site-facing) to learn the MAC addresses of attached routers and run cIGP to learn about host reachability. It is to be understood that the references herein to a layer 2 device include devices that perform layer 3 routing.

Edge device 20(1) comprises a plurality of core network facing interface devices, sometimes referred to herein core interfaces 70(1)-70(N), and a plurality of local network facing interface devices, sometimes referred to herein as site interfaces 75(1)-75(N). Edge device 20(1) also comprises a processor 80, and a memory 85 that includes a MAC table 90 and non-ASM overlay logic 95. Non-ASM overlay logic 95 includes unicast replication list 110 and replication logic 115. When executing appropriate software or firmware, the processor 80 is responsible for such tasks as forwarding table computations, network management, and general processing of packets. The processor 80 generally accomplishes all of these functions under the control of software including an operating system and any appropriate applications software (e.g., non-ASM overlay logic 95).

Site interfaces 75(1)-75(N) are operable for communication with network devices at the same network site as the edge device via a local network. Core interfaces 70(1)-70(N) are operable for communication with edge devices 20(2) and 20(3) in network sites 10(2) and 10(3), respectively. The site interfaces 75(1)-75(N) are layer 2 interfaces connected to intermediate network devices (e.g., site-based switches or site-based routers), and learn the source MAC addresses of traffic they receive. Traffic received on a site interface 75(1)-75(N) may trigger oUMRP advertisements or pMRP group joins. Traffic received on the site interfaces 75(1)-75(N) is forwarded according to table 90 onto another internal interface (regular bridging (or routing in the case of Layer 3 edge device)) or onto the core interface for OTV forwarding.

In one embodiment, the forwarding table 90 is a MAC table of 48-bit MAC addresses. The table 90 may contain unicast MAC addresses or multicast MAC addresses. The table 90 is populated by conventional data-plane learning on site interfaces 75(1)-75(N) and by the IS-IS protocol (or other IGP protocol) at the control plane on the core interfaces 70(1)-70(N). Arrow 100 illustrates data-plane learning on internal interface 65(1) and arrow 105 illustrates control-plane learning on the core interface 70(1). The table 90 allows the same MAC address to be used in different VLANs and potentially in different VPNs.

The core interfaces 70(1)-70(N) are one or more physical network interface devices that are assigned an IP address (e.g., IPB) out of the provider/core address space. Traffic transmitted out of the core interfaces 70(1)-70(N) is encapsulated with an IP header and traffic received on this interface is decapsulated to produce layer 2 frames.

As noted above, edge device 20(1) operates with a non-ASM core network 15 that may be a unicast-only core network or an SSM core network. Also as noted above, the forwarding of packets on an overlay is different depending on the type of non-ASM core. If the core network is an SSM core, processor 80 encapsulates layer 2 (MAC level) packets and forwards them along on one of the core interfaces 70(1)-70(N). The SSM core network then performs any replication. However, in a unicast-only core network example, the core network does not have the ability to perform replication. Therefore, FIG. 3 is an example in which the non-ASM core network is a unicast-only network, and non-ASM overlay logic 95 includes replication logic 115. Replication logic 115, when executed by processor 80, performs the replication of packets, as described above. The replicated packets may then be sent on core interfaces 70(1)-70(N) to other edge devices.

Memory 85 may comprise read only memory (ROM), random access memory (RAM), magnetic disk storage media devices, optical storage media devices, flash memory devices, electrical, optical, or other physical/tangible memory storage devices. The processor 80 is, for example, a microprocessor or microcontroller that executes instructions for the non-ASM logic 95. Thus, in general, the memory 85 may comprise one or more tangible (non-transitory) computer readable storage media (e.g., a memory device) encoded with software comprising computer executable instructions and when the software is executed (by the processor 80) it is operable to perform the operations described herein in connection with non-ASM overlay logic 95 and, in general, cooperate with the adjacency server to establish the overlay network and transmit/receive packets on the overlay network.

Figure 4:
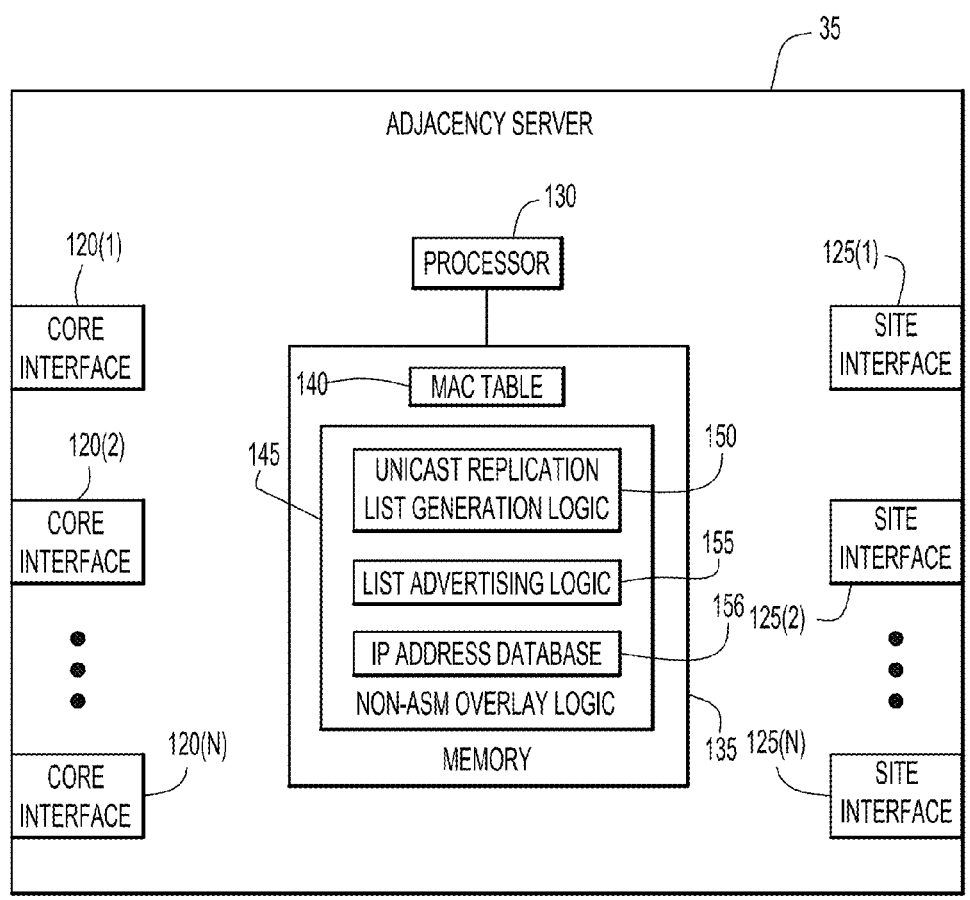
FIG. 4 is a block diagram of an example adjacency server configured to cooperate with one or more edge devices in order to establish an overlay network.

FIG. 4 is a block diagram of one implementation of adjacency server 35 of FIG. 1. Adjacency server 35 comprises a plurality of core network facing interface devices, sometimes referred to herein core interfaces 120(1)-120(N), and a plurality of local network facing interface devices, sometimes referred to herein as site interfaces 125(1)-125(N). Adjacency server 35 also comprises a processor 130, and a memory 135 that includes a MAC table 140 and non-ASM overlay logic 145. Non-ASM overlay logic 145 includes unicast replication list generation logic 150, list advertising logic 155, and IP address database 156.

As noted above, adjacency server 35 is configured to cooperate with edge devices 20(1)-20(3) to establish adjacencies therewith. Additionally, adjacency server 35 is configured to generate a unicast replication list that is advertised to the edge devices 20(1)-20(3). The unicast replication list generation logic 150, when executed by processor 130, generates the list as described above. Additionally, list advertising logic 155, when executed by processor 130, advertises the unicast replication list to edge devices 20(1)-20(3), as described above.

Memory 135 may comprise read only memory (ROM), random access memory (RAM), magnetic disk storage media devices, optical storage media devices, flash memory devices, electrical, optical, or other physical/tangible memory storage devices. The processor 130 is, for example, a microprocessor or microcontroller that executes instructions for the non-ASM logic 145. Thus, in general, the memory 135 may comprise one or more tangible (non-transitory) computer readable storage media (e.g., a memory device) encoded with software comprising computer executable instructions and when the software is executed (by the processor 130) it is operable to perform the operations described herein in connection with non-ASM overlay logic 145 and, in general, cooperate with the edge devices to establish and maintain the overlay network.

It will be appreciated that, apart from adjacency formation, the adjacency server 35 is also configured to encapsulate/decapsulate data traffic. Once the replication list is generated, all the devices replicate control packets to all destinations (e.g., ISIS hello packets), replicate broadcast data and or link local data to all destinations, and replicate multicast data to appropriate destinations (i.e., to a subset of the replication-list). The adjacency server 35, while performing the role of generating the replication list, may also "use" that replication list like any other edge device and replicate both control and data packets in and out of the VPN. Similarly other devices may send both control and data traffic to the adjacency server and other devices in the replication list.

Figure 5:
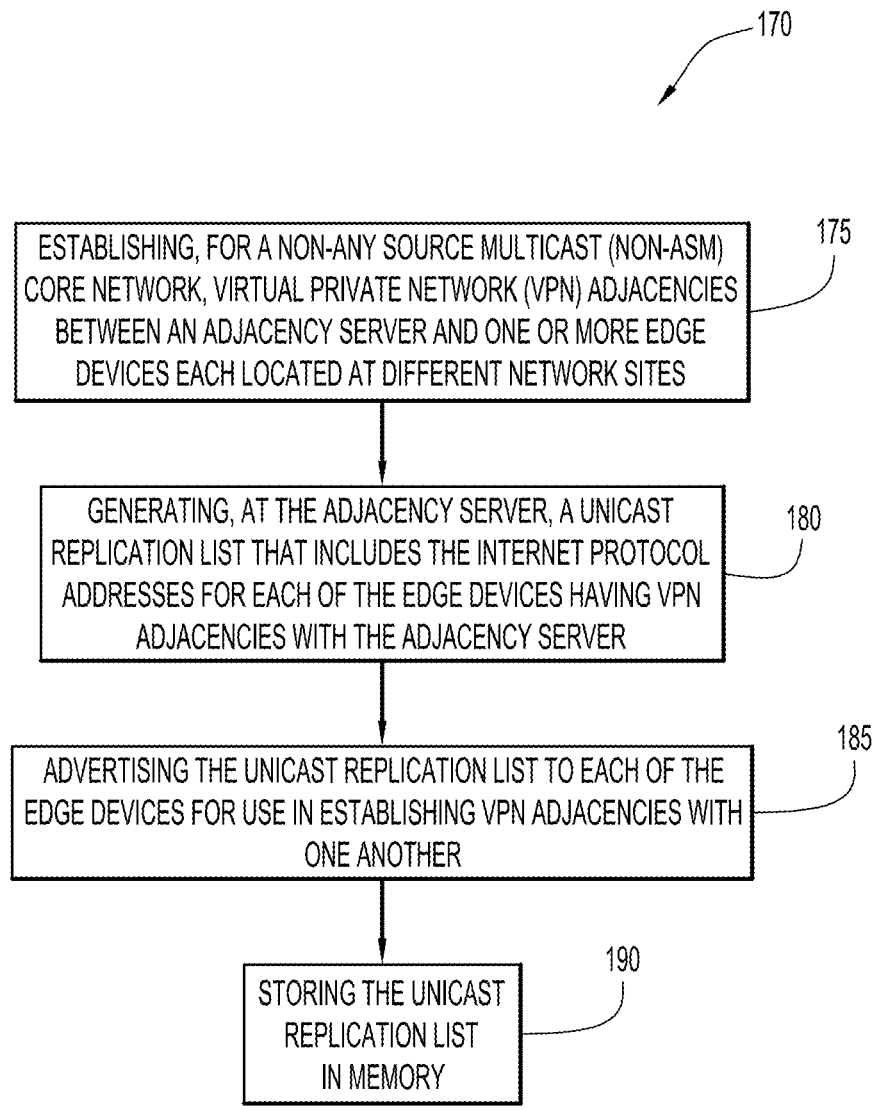
FIG. 5 is a flowchart of operations performed by an adjacency server in accordance with examples described herein.

FIG. 5 is a flowchart of operations of a method 170 executed at an adjacency server in accordance with examples described herein. The adjacency server is connected to a non-ASM core network. At 175, VPN adjacencies (i.e., overlay network adjacencies) are established between the adjacency server and one or more edge devices each located at different network sites. At 180, a unicast replication list is generated at the adjacency server. The unicast replication list includes the Internet Protocol addresses for each of the edge devices having VPN adjacencies with the adjacency server. At 185, the unicast replication list is advertised to each of the edge devices. The edge devices may use the unicast replication list to establish VPN adjacencies with one another (i.e., establish overlay network adjacencies between the edge devices and form a fully meshed overlay network). Additionally, at 190 the unicast replication list is stored in memory of the adjacency server.

Figure 6:
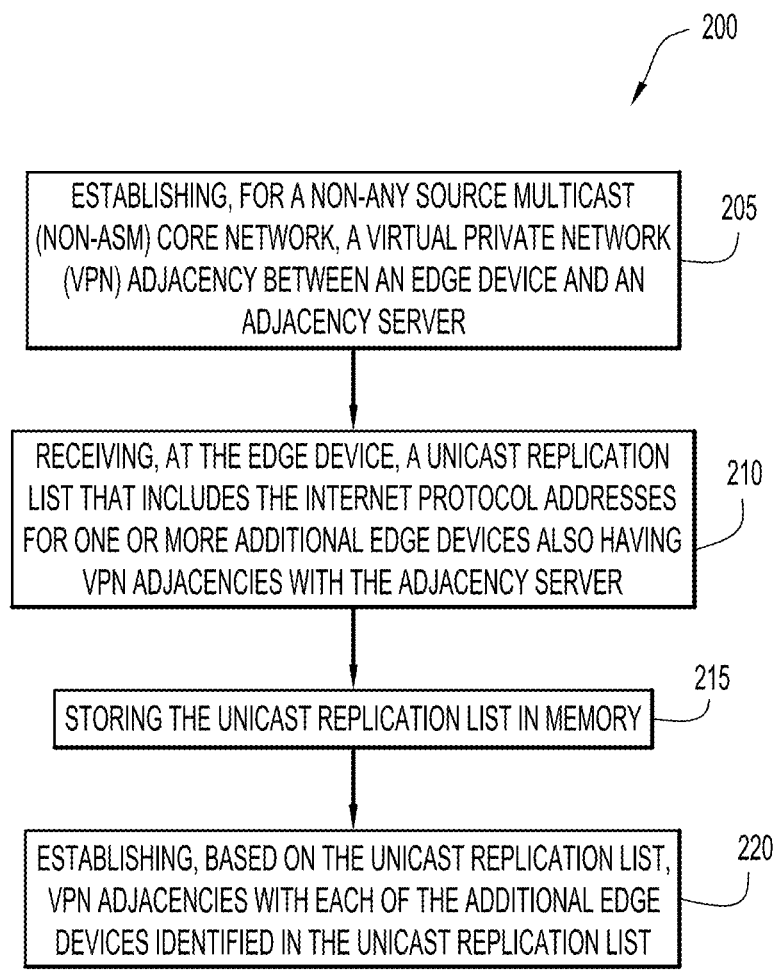
FIG. 6 is a flowchart of operations performed by an edge device in accordance with examples described herein.

FIG. 6 is a flowchart of operations of a method 200 executed at an edge device in accordance with examples described herein. The edge device is connected to a non-ASM core network. At 205, a VPN adjacency (i.e., overlay network adjacency) is established between the edge device and an adjacency server. At 210, a unicast replication list is received at the edge device from the adjacency server. The unicast replication list includes the Internet Protocol addresses for one or more additional edge devices also having VPN adjacencies with the adjacency server. At 215, the unicast replication list is stored in memory on the edge device. At 220, using the unicast replication list, VPN adjacencies are established with each of the additional edge devices identified in the unicast replication list (i.e., establish overlay network adjacencies between the edge devices and form a fully meshed overlay network).

The above description is intended by way of example only.

What is claimed is:

1. A method comprising:
   receiving, at an adjacency server, a first adjacency initialization packet from a first edge device, the first edge device being connected to the adjacency server by a non-any source multicast (non-ASM) core network and the first adjacency initialization packet including a first Internet Protocol (IP) address for the first edge device;
   sending a first response adjacency initialization packet back to the first edge device to establish a virtual private network (VPN) adjacency between the adjacency server and the first edge device;
   adding the first IP address to a unicast replication list that stores IP addresses for edge devices each having a VPN adjacency with the adjacency server;
   receiving, at the adjacency server, a second adjacency initialization packet from a second edge device, the second edge device being connected to the adjacency server by the non-ASM core network and the second adjacency initialization packet including a second IP address for the second edge device;
   sending a second response adjacency initialization packet back to the second edge device to establish a VPN adjacency between the adjacency server and the second edge device;
   adding the second IP address to the unicast replication list; and
   advertising, by the adjacency server, the unicast replication list to each of the edge devices that has an IP address in the unicast replication list for the edge devices to establish VPN adjacencies with one another over the non-ASM core network.

2. The method of claim 1, wherein advertising the unicast replication list comprises:
   encapsulating the unicast replication list in a packet that is sent via individual unicast messages to each of the edge devices.

3. The method of claim 1, further comprising:
   periodically advertising the unicast replication list to the edge devices.

4. The method of claim 1, and further comprising:
   receiving from a subset of the edge devices that has an IP address in the unicast replication list one or more packets indicating that the edge devices in the subset are each members of a multicast group;
   generating a subset-unicast replication list that identifies the subset of the edge devices as members of the multicast group; and
   advertising the subset-unicast replication list to each of the subset of the edge devices.

5. A method comprising:
   sending an adjacency initialization packet from an edge device to an adjacency server, the edge device being connected to the adjacency server by a non-any source multicast (non-ASM) core network and the adjacency initialization packet including an Internet Protocol (IP) address for the edge device;
   receiving a response adjacency initialization packet from the adjacency server indicating a virtual private network (VPN) adjacency having been established between the edge device and the adjacency server over the non-ASM core network;
   receiving, from the adjacency server at the edge device, a unicast replication list that includes Internet Protocol addresses for edge devices each having a VPN adjacency with the adjacency server;
   storing the unicast replication list in memory of the edge device; and
   establishing, based on the unicast replication list, VPN adjacencies with each of other edge devices identified in the unicast replication list over the non-ASM core network.

6. The method of claim 5, wherein the non-ASM core network is a source specific multicast core network, further comprising:
   joining a multicast channel and one or more source specific trees associated with the multicast channel.

7. The method of claim 5, wherein the non-ASM core network is a unicast-only core network, further comprising:
   determining that a multicast packet is to be sent to each of the other edge devices identified in the unicast replication list via the VPN adjacencies;
   unicast replicating the multicast packet to form multiple packets; and
   transmitting the multiple packets to each of the other edge devices identified in the unicast replication list in individual unicast messages via the VPN adjacencies.

8. The method of claim 5, further comprising:
   periodically receiving the unicast replication list from the adjacency server.

9. The method of claim 5, further comprising:
   retaining, for a predetermined period of time, the Internet Protocol address corresponding to a timed out VPN adjacency in the unicast replication list stored in memory; and
   removing the Internet Protocol address corresponding to the timed out VPN adjacency from the unicast replication list after expiration of the predetermined period of time.

10. An apparatus comprising:
    one or more network interfaces; and
    a processor coupled to the one or more network interfaces, wherein the processor is configured to:
      receive a first adjacency initialization packet from a first edge device, the first edge device being connected to the apparatus by a non-any source multicast (non-ASM) core network and the first adjacency initialization packet including a first Internet Protocol (IP) address for the first edge device;

send a first response adjacency initialization packet back to the first edge device to establish a virtual private network (VPN) adjacency between the apparatus and the first edge device;

add the first IP address to a unicast replication list that stores IP addresses for edge devices each having a VPN adjacency with the apparatus;

receive a second adjacency initialization packet from a second edge device, the second edge device being connected to the apparatus by the non-ASM core network and the second adjacency initialization packet including a second IP address for the second edge device;

send a second response adjacency initialization packet back to the second edge device to establish a VPN adjacency between the apparatus and the second edge device;

add the second IP address to the unicast replication list; and advertise the unicast replication list to each of the edge devices that has an IP address in the unicast replication list for the edge devices to establish VPN adjacencies with one another over the non-ASM core network.

11. The apparatus of claim 10, wherein to advertise the unicast replication list the processor is configured to encapsulate the unicast replication list in a packet that is sent via individual unicast messages to each of the edge devices.

12. The apparatus of claim 10, wherein the processor is further configured to receive from a subset of the edge devices that has an IP address in the unicast replication list one or more packets indicating that the edge devices in the subset are each members of a multicast group, generate a subset-unicast replication list that identifies the subset of the edge devices as members of the multicast group, and advertise the subset-unicast replication list to each of the subset of the edge devices.

13. An apparatus comprising:
one or more network interfaces;
a memory; and
a processor coupled to the one or more network interfaces and the memory, wherein the processor is configured to:
send an adjacency initialization packet from the apparatus to an adjacency server, the apparatus being an edge device connected to the adjacency server by a non-any source multicast (non-ASM) core network and the adjacency initialization packet including an Internet Protocol (IP) address for the apparatus;
receive a response adjacency initialization packet from the adjacency server indicating a virtual private network (VPN) adjacency having been established between the edge device and the adjacency server over the non-ASM core network,
receive, from the adjacency server, a unicast replication list that includes Internet Protocol addresses for edge devices each having a VPN adjacency with the adjacency server,
store the unicast replication list in the memory, and
establish, based on the unicast replication list, VPN adjacencies with each of other edge devices identified in the unicast replication list over the non-ASM core network.

14. The apparatus of claim 13, wherein the non-ASM core network is a source specific multicast core network, and wherein the processor is configured to join the edge device with a multicast channel and one or more source specific trees associated with the multicast channel.

15. The apparatus of claim 13, wherein the non-ASM core network is a unicast-only core network, and wherein the processor is configured to determine that a multicast packet is to be sent to each of the other edge devices identified in the unicast replication list via the VPN adjacencies, unicast replicate the multicast packet to form multiple packets, and transmit the multiple packets to each of other edge devices identified in the unicast replication list in individual unicast messages via the VPN adjacencies.

16. One or more non-transitory computer readable storage media encoded with software comprising computer executable instructions and when the software is executed operable to:
receive, at an adjacency server, a first adjacency initialization packet from a first edge device, the first edge device being connected to the adjacency server by a non-any source multicast (non-ASM) core network and the first adjacency initialization packet including a first Internet Protocol (IP) address for the first edge device;
send a first response adjacency initialization packet back to the first edge device to establish a virtual private network (VPN) adjacency between the adjacency server and the first edge device;
add the first IP address to a unicast replication list that stores IP addresses for edge devices each having a VPN adjacency with the adjacency server;
receive, at the adjacency server, a second adjacency initialization packet from a second edge device, the second edge device being connected to the adjacency server by the non-ASM core network and the second adjacency initialization packet including a second IP address for the second edge device;
send a second response adjacency initialization packet back to the second edge device to establish a VPN adjacency between the adjacency server and the second edge device;
add the second IP address to the unicast replication list; and
advertise, from the adjacency server, the unicast replication list to each of the edge devices that has an IP address in the unicast replication list for the edge devices to establish VPN adjacencies with one another over the non-ASM core network.

17. The non-transitory computer readable storage media of claim 16, wherein the instructions operable to advertise the unicast replication list comprise instructions operable to:
encapsulate the unicast replication list in a packet that is sent via individual unicast messages to each of the edge devices.

18. The non-transitory computer readable storage media of claim 16, further comprising instructions operable to:
receive from a subset of the edge devices that has an IP address in the unicast replication list one or more packets indicating that the edge devices in the subset are each members of a multicast group;
generate a subset-unicast replication list that identifies the subset of the edge devices as members of the multicast group; and
advertise the subset-unicast replication list to each of the subset of the edge devices.

19. One or more non-transitory computer readable storage media encoded with software comprising computer executable instructions and when the software is executed operable to:
send an adjacency initialization packet from an edge device to an adjacency server, the edge device being connected to the adjacency server by a non-any source multicast (non-ASM) core network and the adjacency initialization packet including an Internet Protocol (IP) address for the edge device;

receive a response adjacency initialization packet from the adjacency server indicating a virtual private network (VPN) adjacency having been established between the edge device and the adjacency server over the non-ASM core network;

receive, at the edge device, a unicast replication list that includes Internet Protocol addresses for edge devices each having a VPN adjacency with the adjacency server;

store the unicast replication list in memory; and establish, based on the unicast replication list, VPN adjacencies with each of other edge devices identified in the unicast replication list over the non-ASM core network.

20. The non-transitory computer readable storage media of claim 19, wherein the non-ASM core network is a source specific multicast core network, further comprising instructions operable to:

join the edge device with a multicast channel and one or more source specific trees associated with the multicast channel.

21. The non-transitory computer readable storage media of claim 19, wherein the non-ASM core network is a unicast-only core network, and further comprising instructions operable to:

determine that a multicast packet is to be sent to each of the other edge devices identified in the unicast replication list via the VPN adjacencies;

unicast replicate the multicast packet to form multiple packets; and transmit the multiple packets to each of the other edge devices identified in the unicast replication list in individual unicast messages via the VPN adjacencies.

* * * * *